(12) United States Patent
Lade et al.

(10) Patent No.: US 11,951,889 B2
(45) Date of Patent: Apr. 9, 2024

(54) SEATBACK SPEAKERS

(71) Applicant: Bose Corporation, Framingham, MA (US)

(72) Inventors: Nicholas K. Lade, Waltham, MA (US); Bradford Kyle Subat, Northborough, MA (US); Charles Terence Henry Oswald, Salem, NY (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/108,041

(22) Filed: Feb. 10, 2023

(65) Prior Publication Data

US 2023/0191970 A1    Jun. 22, 2023

Related U.S. Application Data (63) Continuation of application No. 17/333,057, filed on May 28, 2021, now Pat. No. 11,590,869.

(51) Int. Cl.
*B60N 2/879* (2018.01)
*B60R 11/00* (2006.01)
*B60R 11/02* (2006.01)
*H04R 1/26* (2006.01)
(Continued)

(52) U.S. Cl.
CPC .......... *B60N 2/879* (2018.02); *B60R 11/0217* (2013.01); *H04R 1/26* (2013.01); *H04R 1/323* (2013.01); *H04R 5/023* (2013.01); *B60R 2011/0015* (2013.01)

(58) Field of Classification Search
None
See application file for complete search history.

(56) References Cited

U.S. PATENT DOCUMENTS

| | | | |
|---|---|---|---|
| 2,908,766 A | 10/1959 | Taylor | |
| 3,792,754 A | 2/1974 | Hanson | |
| 4,210,784 A | 7/1980 | Phillips | |

(Continued)

FOREIGN PATENT DOCUMENTS

| | | |
|---|---|---|
| CN | 205033978 U | 2/2016 |
| DE | 69829943 T2 | 3/2006 |

(Continued)

OTHER PUBLICATIONS

PCT International Search Report and Written Opinion for International Application No. PCT/US2021/034701, dated Sep. 15, 2021, 17 pages.

(Continued)

*Primary Examiner* — Kenny H Truong
(74) *Attorney, Agent, or Firm* — Hoffman Warnick LLC (57) ABSTRACT

Various implementations include seats and related loudspeakers. In particular cases, a seat includes: a seat headrest portion; a seat backrest portion; and a loudspeaker assembly. The loudspeaker assembly includes at least one driver for generating an acoustic output; and an acoustic exit fixed in the seat backrest portion and angled to provide the acoustic output to a location below a nominal ear position of an occupant of the seat, wherein a firing angle of the at least one driver provides the acoustic output to achieve a consistent frequency response across a range of positions deviating from the nominal ear position.

16 Claims, 8 Drawing Sheets

(51) Int. Cl.
*H04R 1/32* (2006.01)
*H04R 5/02* (2006.01)

(56) References Cited

U.S. PATENT DOCUMENTS

| | | | |
|---|---|---|---|
| 4,440,443 A | 4/1984 | Nordskog | |
| 4,868,888 A | 9/1989 | Dayton | |
| 6,136,879 A | 10/2000 | Nishida et al. | |
| 6,681,024 B2 | 1/2004 | Klein et al. | |
| 7,819,480 B2 | 10/2010 | Asbury et al. | |
| 8,654,997 B2 | 2/2014 | Meehan et al. | |
| 8,668,045 B2 | 3/2014 | Cohen | |
| 8,913,777 B2 | 12/2014 | Pelliccio et al. | |
| 9,517,732 B2 | 12/2016 | Silzle et al. | |
| 9,699,537 B2 | 7/2017 | Oswald et al. | |
| 10,455,327 B2 | 10/2019 | Oswald et al. | |
| 10,596,941 B2 | 3/2020 | Kakishima et al. | |
| 10,721,554 B2 | 7/2020 | Groleau et al. | |
| 10,730,422 B2 | 8/2020 | Oswald et al. | |
| 10,909,963 B2 | 2/2021 | Christoph | |
| 11,178,488 B2 | 11/2021 | Watanabe et al. | |
| 11,343,602 B2 | 5/2022 | Winton et al. | |
| 2004/0021350 A1 | 2/2004 | House | |
| 2005/0286735 A1 | 12/2005 | Ikeuchi | |
| 2007/0098205 A1 | 5/2007 | Holmi et al. | |
| 2008/0018162 A1 | 1/2008 | Galbreath et al. | |
| 2009/0295202 A1 | 12/2009 | Takada et al. | |
| 2010/0072795 A1 | 3/2010 | Meixner et al. | |
| 2010/0244511 A1 | 9/2010 | Gomes et al. | |
| 2011/0228959 A1 | 9/2011 | Meehan et al. | |
| 2012/0051579 A1 | 3/2012 | Cohen | |
| 2013/0101823 A1 | 4/2013 | Sanderson et al. | |
| 2013/0140862 A1 | 6/2013 | Silzle et al. | |
| 2014/0203611 A1 | 7/2014 | Kondrad et al. | |
| 2014/0219492 A1 | 8/2014 | Pelliccio et al. | |
| 2014/0355783 A1 | 12/2014 | Subat | |
| 2015/0201260 A1 | 7/2015 | Oswald et al. | |
| 2017/0072869 A1 | 3/2017 | Ito et al. | |
| 2017/0214988 A1* | 7/2017 | Ferretti | B60N 2/68 |
| 2017/0334708 A1 | 11/2017 | Cheon | |
| 2018/0035185 A1 | 2/2018 | Fujita et al. | |
| 2018/0118063 A1 | 5/2018 | Oswald | B64D 11/00154 |
| 2018/0297248 A1 | 10/2018 | Morgan et al. | |
| 2020/0128312 A1 | 4/2020 | Christoph | H04R 1/026 |
| 2020/0189436 A1 | 6/2020 | Soltner | |
| 2020/0317104 A1 | 10/2020 | Oswald et al. | |

FOREIGN PATENT DOCUMENTS

| | | |
|---|---|---|
| EP | 2003923 B8 | 10/2015 |
| EP | 2989808 A1 | 3/2016 |
| JP | S55176595 U | 12/1980 |
| JP | S5798092 U | 6/1982 |
| JP | 2001146136 A | 5/2001 |
| JP | 2004097654 A | 4/2004 |
| JP | 2007221485 A | 8/2007 |
| JP | 2008173998 A | 7/2008 |
| JP | 2009094824 A | 4/2009 |
| WO | 2014158711 A1 | 10/2014 |
| WO | 2014193685 A1 | 12/2014 |
| WO | 2015108860 A1 | 7/2015 |
| WO | 2016089665 A1 | 6/2016 |
| WO | 2017160594 A1 | 9/2017 |
| WO | 2019146254 A1 | 8/2019 |

OTHER PUBLICATIONS

International Search Report and Written Opinion for PCT Application No. PCT/US2022/028337, dated Aug. 1, 2022, 17 pages.

* cited by examiner

SEATBACK SPEAKERS

PRIORITY CLAIM

This application is a continuation application of, and claims priority to, U.S. patent application Ser. No. 17/333,057, (filed May 28, 2021) the entire contents of which are incorporated by reference herein.

TECHNICAL FIELD

This disclosure generally relates to seats. More particularly, the disclosure relates to seats with speakers having an acoustic exit in the seatback.

BACKGROUND

Conventional seats, for example, in vehicles, entertainment venues, and other locations, focus on user support and comfort. In some cases, these seats integrate speakers for providing audio output. However, these conventional seats fail to provide a consistent, satisfactory acoustic output to a range of distinct users and/or seating positions.

SUMMARY

All examples and features mentioned below can be combined in any technically possible way.

Various implementations include seats and vehicles including seats. In particular cases, the seats include a loudspeaker assembly with an acoustic exit that is directed to provide an acoustic output to achieve a consistent frequency response across a range of positions that deviate from a nominal ear position.

In some particular aspects, a seat includes: a seat headrest portion; a seat backrest portion; and a loudspeaker assembly including: at least one driver for generating an acoustic output; and an acoustic exit fixed in the seat backrest portion and angled to provide the acoustic output to a location below a nominal ear position of an occupant of the seat, wherein a firing angle of the at least one driver provides the acoustic output to achieve a consistent frequency response across a range of positions deviating from the nominal ear position.

In additional particular aspects, a vehicle includes a seat having: a seat headrest portion; a seat backrest portion; and a loudspeaker assembly including: at least one driver for generating an acoustic output; and an acoustic exit fixed in the seat backrest portion and angled to provide the acoustic output to a location below a nominal ear position of an occupant of the seat, where a firing angle of the at least one driver provides the acoustic output to achieve a consistent frequency response across a range of positions deviating from the nominal ear position.

In further particular aspects, a method includes providing an acoustic output in a loudspeaker assembly. The loudspeaker assembly is located in a seat that has a seat headrest portion and a seat backrest portion. The loudspeaker assembly has at least one driver for generating the acoustic output, and an acoustic exit fixed in the seat backrest portion and angled to provide the acoustic output to a location below a nominal ear position of an occupant of the seat. In various implementations, the firing angle of the at least one driver provides the acoustic output to achieve a consistent frequency response across a range of positions deviating from the nominal ear position.

Implementations may include one of the following features, or any combination thereof.

In certain aspects, the nominal ear position of the occupant is the expected seating position (or, location) for the occupant. In particular cases, this nominal ear position is equal to the ear position of the median American male.

In particular cases, the acoustic exit is located below the nominal ear position of the occupant relative to a hip point of the seat, where the consistent frequency response is characterized by a high frequency (HF) consistency greater than an HF consistency for an acoustic output provided to the nominal ear position.

In some implementations, the acoustic output from the seat has a HF frequency response variation equal to or less than approximately one-half a HF frequency response variation for the acoustic output provided to the nominal ear position.

In particular cases, the HF frequency response variation of the acoustic output from the seat is approximately one-third to approximately one-half the HF frequency response variation for the acoustic output provided to the nominal ear position.

In some implementations, HF is at least approximately 4 kilo-Hertz (kHz), and

LF is equal to approximately 1 kHz or less.

In particular cases, mid-range frequency (MF) is equal to approximately 1 kHz to approximately 4 kHz. In certain implementations, the acoustic output from the seat has a MF frequency response variation that is less than a MF frequency response variation for the acoustic output provided to the nominal ear position.

In some aspects, the consistent frequency response is further characterized by a LF consistency equal to or greater than a LF consistency for an acoustic output provided to the nominal ear position.

In particular implementations, the seat includes a vehicle seat and the loudspeaker assembly is positioned in an outboard location (e.g., closer to an external wall or door), and the LF consistency of the acoustic output from the seat is greater than the LF consistency for the acoustic output provided to the nominal ear position.

In particular cases, the consistent frequency response includes a frequency response of the loudspeaker assembly, and the acoustic output is characterized by at least one of: inter-aural isolation for the occupant, or seat-to-seat isolation between multiple occupants of a space including the seat.

In certain implementations, the seat includes two loudspeaker assemblies, and the seat-to-seat isolation is maintained by both loudspeaker assemblies in the seat.

In some aspects, the location is approximately 60 millimeters below the nominal ear position, plus or minus approximately 50 millimeters, as measured from a hip point of the seat.

In particular aspects, the at least one driver is located proximate the acoustic exit.

In some cases, the at least one driver is separated from the acoustic exit. In particular aspects, a channel or a waveguide is located between the driver and the exit, such that the driver is located closer to the base of the seat or the center of the seat than the acoustic exit.

In certain aspects, the positions deviating from the nominal ear position include lower positions associated with occupants sitting lower in the seat, or higher positions associated with occupants sitting higher in the seat.

In particular cases, the at least one driver has a downward firing angle relative to a horizontal plane intersecting the front surface of the seat backrest portion adjacent to the acoustic exit. This occurs when the acoustic exit is further from the hip point.

In some implementations, the acoustic exit has an upward firing angle relative to a horizontal plane intersecting the front surface of the seat backrest portion adjacent to the acoustic exit. This occurs when the acoustic exit is closer to the hip point.

In particular aspects, at a recline angle of approximately 21 degrees from vertical, a center of the acoustic exit is approximately 562 mm to approximately 650 mm vertically higher than a hip point of the seat. In particular examples, at the 21 degree recline angle, the center of the acoustic exit is approximately 562 mm to approximately 577 mm vertically higher than the hip point of the seat, and in more particular examples, the center of the acoustic exit (at 21 degree recline angle) is approximately 567 mm to approximately 572 mm vertically higher than the hip point of the seat.

In other particular examples, at the 21 degree recline angle, the center of the acoustic exit is approximately 642 mm to approximately 652 mm vertically higher than the hip point of the seat. In more particular cases, the height (h) of the exit is equal to or less than approximately 650 mm, and in certain of these cases, is equal to approximately 647 mm.

In certain cases, the acoustic exit is fixed relative to the seat backrest portion.

In some implementations, the seat headrest portion is adjustable relative to the seat backrest portion.

In particular aspects, the seat headrest portion has at least a section that is vertically aligned with a section of the seat backrest portion relative to a hip point of the seat.

In certain implementations, the seat backrest extends above a nominal shoulder of the occupant.

In some cases, the seat is one of: a vehicle driver seat, a vehicle passenger seat, an entertainment venue seat, a gaming seat, or a home entertainment seat.

In certain implementations, the vehicle passenger seat is a seat in a ride sharing vehicle, a limousine, a bus, or a public transit vehicle. In particular cases, the vehicle passenger seat is one of a plurality of vehicle passenger seats, one or more of which includes the loudspeaker assembly. In some aspects, the vehicle passenger seats are arranged facing one another, such as in an across-the-aisle configuration or a huddle-around configuration.

In particular aspects, the seat backrest portion has a middle portion and two flanks extending from opposite sides of the middle portion, where without the occupant in the seat, a front surface of the backrest at each flank is angled relative to a front surface of the middle portion, and wherein the acoustic exit of the loudspeaker assembly is located in one of the flanks. In certain of these cases, the acoustic exit has an inward firing angle relative to the front surface of the middle portion.

In some cases, the acoustic exit of each loudspeaker assembly is separated from a centerline of the seat backrest portion by approximately 180 mm to approximately 330 mm. In particular cases, the acoustic exit of each loudspeaker assembly is separated from the centerline of the seat backrest portion by approximately 200 mm in a narrower case, and approximately 300 mm in a wider case.

In some cases, a vehicle includes the seat.

Two or more features described in this disclosure, including those described in this summary section, may be combined to form implementations not specifically described herein.

The details of one or more implementations are set forth in the accompanying drawings and the description below.

Other features, objects and benefits will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a loudspeaker, or a set of loudspeakers, can be beneficially deployed in a seat to provide a consistent frequency response across a range of seating positions. For example, a seat such as a vehicle seat, entertainment venue seat, gaming seat, home entertainment seat, etc., can include a loudspeaker assembly with an acoustic exit that is angled to provide an acoustic output to achieve a consistent frequency response across a range of positions that deviate from a nominal ear position of a seat occupant. In various implementations, the acoustic exit of each loudspeaker assembly is fixed in the seat backrest portion of the seat. In particular cases, the acoustic exit of each loudspeaker assembly is located at or below the nominal ear position of the seat occupant relative to the hip point of the seat. When compared with conventional seats, the seats and vehicles disclosed herein provide more consistent, higher quality acoustic output across a range of seating positions.

Commonly labeled components in the FIGURES are considered to be substantially equivalent components for the purposes of illustration, and redundant discussion of those components is omitted for clarity.

Seats, for example, vehicle seats (such as seats used in cars, trucks, buses, trains, aircraft, boats or other vehicles), entertainment venue seats (e.g., movie theater seats, sporting or concert venue seats, etc.), gaming seats, and/or home entertainment seats (e.g., home theater seats) can be fitted with acoustic transducers or speakers for delivering an acoustic experience. In some cases, speakers are fitted into seats such that the speakers are proximate to the ears of an occupant of the seat. In some cases, speakers are integrated within seat headrests or headrest wings. Such headrest speakers can provide excellent acoustic performance (e.g., in terms of providing inter-seat isolation and/or binaural control, e.g., inter-aural parameter control) by virtue of being close to the ears of the seat occupant. However, for some seats (e.g., some vehicle seats), headrest speakers may not be the best choice. For example, mechanical and electrical integration may be challenging in some cases. Some headrests are designed to be thin and low-bulk and may not have enough volume to accommodate headrest speakers. Headrest speakers may cause the seat or headrest to have a high center of mass (and thereby possibly needing additional seat reinforcements). Speakers may compete with other mechanical components of the headrest. In addition, wiring headset speakers through headrest connectors may be challenging for some seats. Even further, headrest wings can limit visibility, cause safety concerns and/or undesirable acoustic performance when a user turns his head.

Seat speakers may also be integrated, at least in part, in a backrest of a vehicle seat. Some such speakers may be disposed on a top surface of a backrest or otherwise very near the top surface, e.g., as close to the ears as possible, and configured to radiate acoustic energy towards a nominal ear position of a seat occupant. From an integration perspective, backrest speakers may be preferred over headrest speakers in some cases, for example, because they have a lower center of mass than headrest speakers, may be easier to integrate into seats due to more available space in the seat backrest and/or because unlike headrest speakers, the associated wiring does not need to be passed through the headrest posts.

The technology described in this document allows for leveraging the advantages of backrest speakers in an improved manner such that may rival or beat the acoustic performance of headrest speakers. In various implementations, the technology described in this document can leverage advantages of backrest speakers in an improved manner relative to headrest speakers, particularly for acoustic experiences that go beyond music reproduction, e.g., conducting phone calls and/or outputting audio at distinct volume levels relative to other seats in a vehicle. Examples disclosed herein provide a broadly acceptable acoustic performance across a range of potential occupants by conveying acoustic energy with a directivity aimed at a relatively low angle as compared to those directed to a nominal ear position. In various examples, the acoustic output exits the backrest from a location below the nominal ear position relative to the seat's hip point. In particular examples, the acoustic output achieves a consistent frequency response across a range of positions that deviate from the nominal ear position. In some examples, an acoustic assembly may include an enclosure or mounting point, one or more loudspeakers, and one or more acoustic channels that convey acoustic energy from the speakers to exits disposed in the seat backrests. The acoustic assembly is configured to provide a directionality at a relatively low angle, aimed lower than a nominal ear position of an expected group of occupants.

Figure 1:
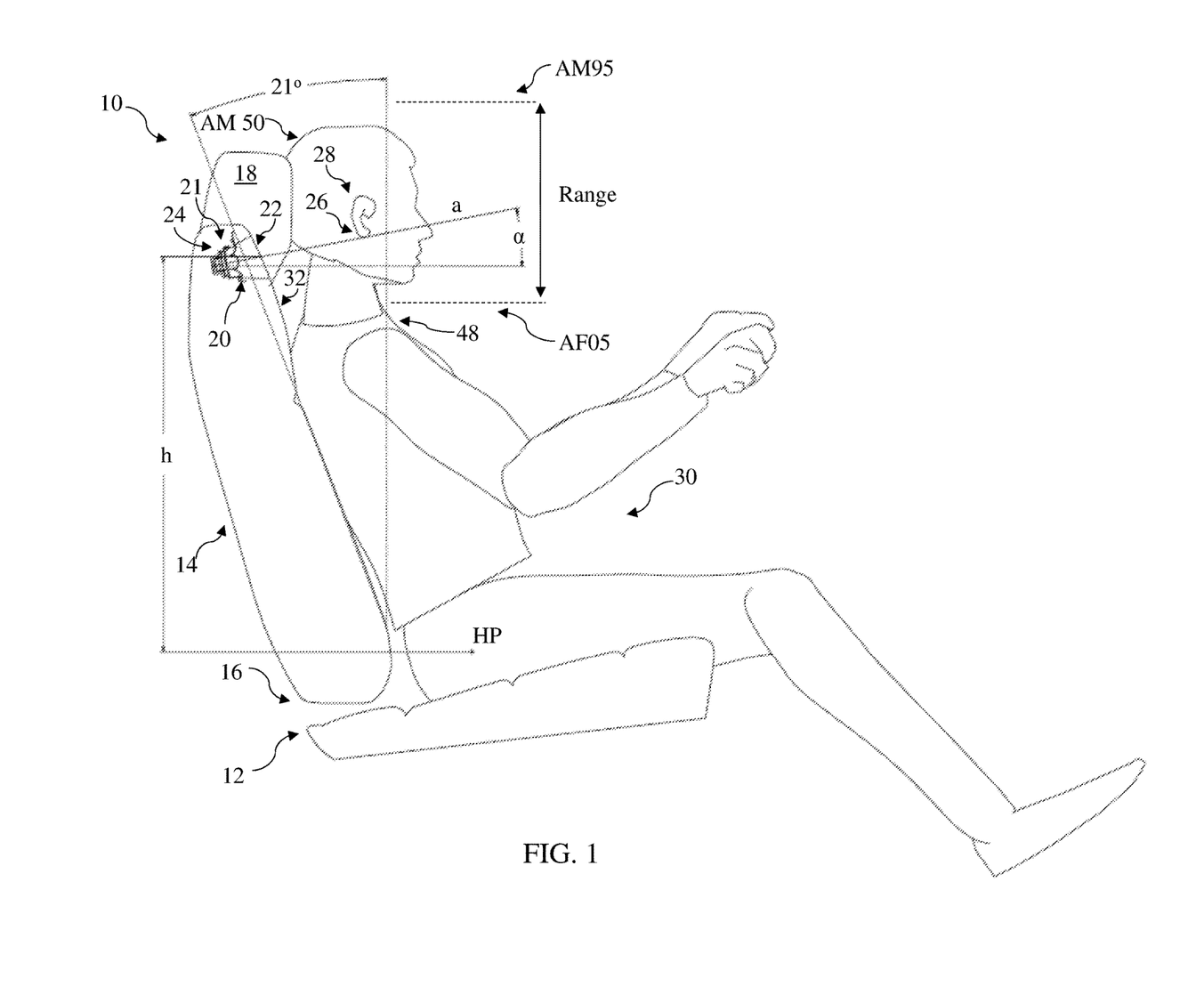
FIG. 1 is a schematic side view of an example seat according to various implementations.

As used herein, the term "nominal ear position" is based upon the ear positions of a typical male of a given population. For such purposes, the term "typical" may mean the median ($50^{th}$ percentile) ear positions relative to the seat, which may be relative to a headrest surface and/or hip point when seated (e.g., as may be defined by SURFACE VEHICLE STANDARD J826, titled, "Devices for Use in Defining and Measuring Vehicle Seating Accommodation, dated November 2015, available from SAE International). For the purposes of illustration, the subject population used herein is American adult men. Positioning of a median adult male, e.g., in FIG. 1, is annotated as AM50. Half of the adult male population is expected to have a higher ear position and half lower.

Figure 2:
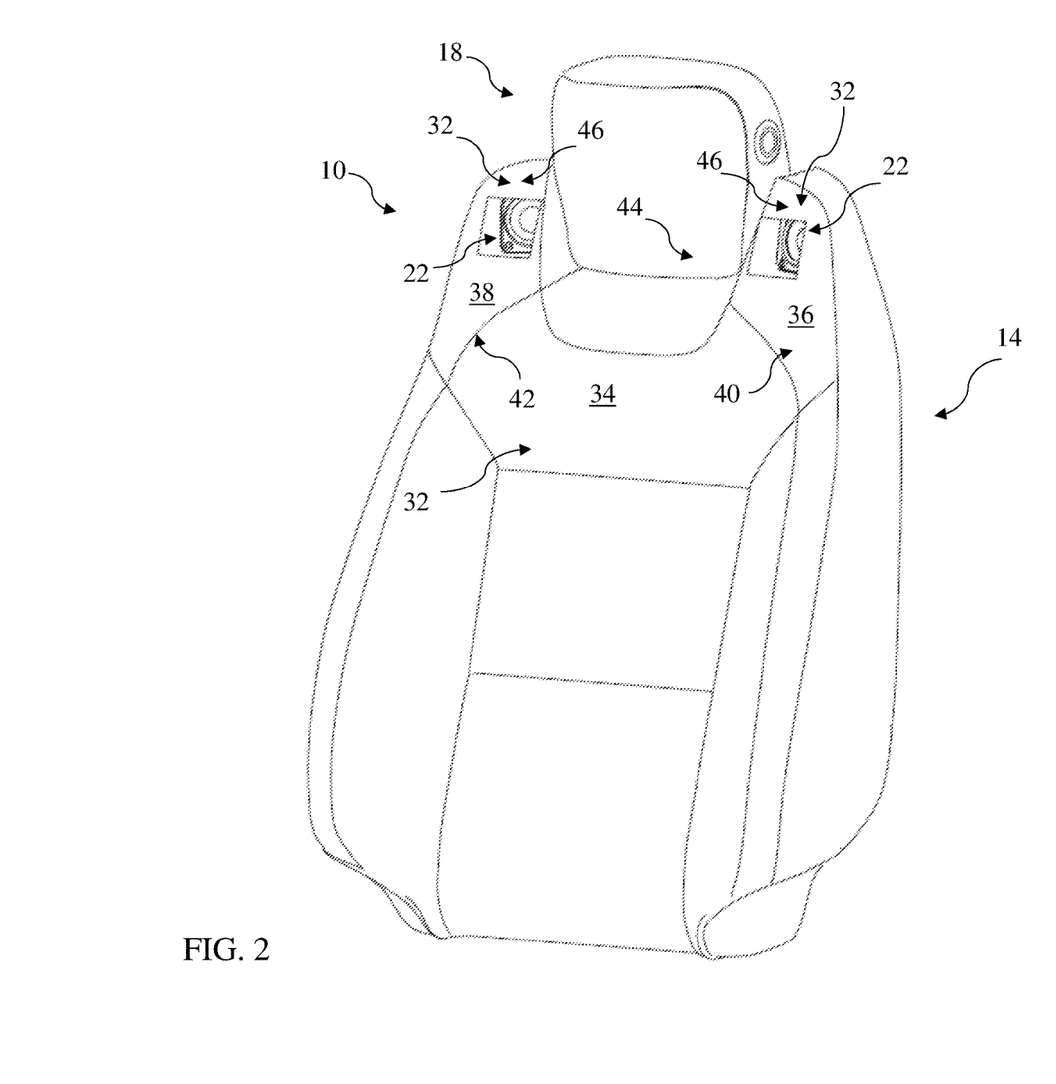
FIG. 2 is a perspective view of a portion of a seat, according to various implementations.
Figure 3:
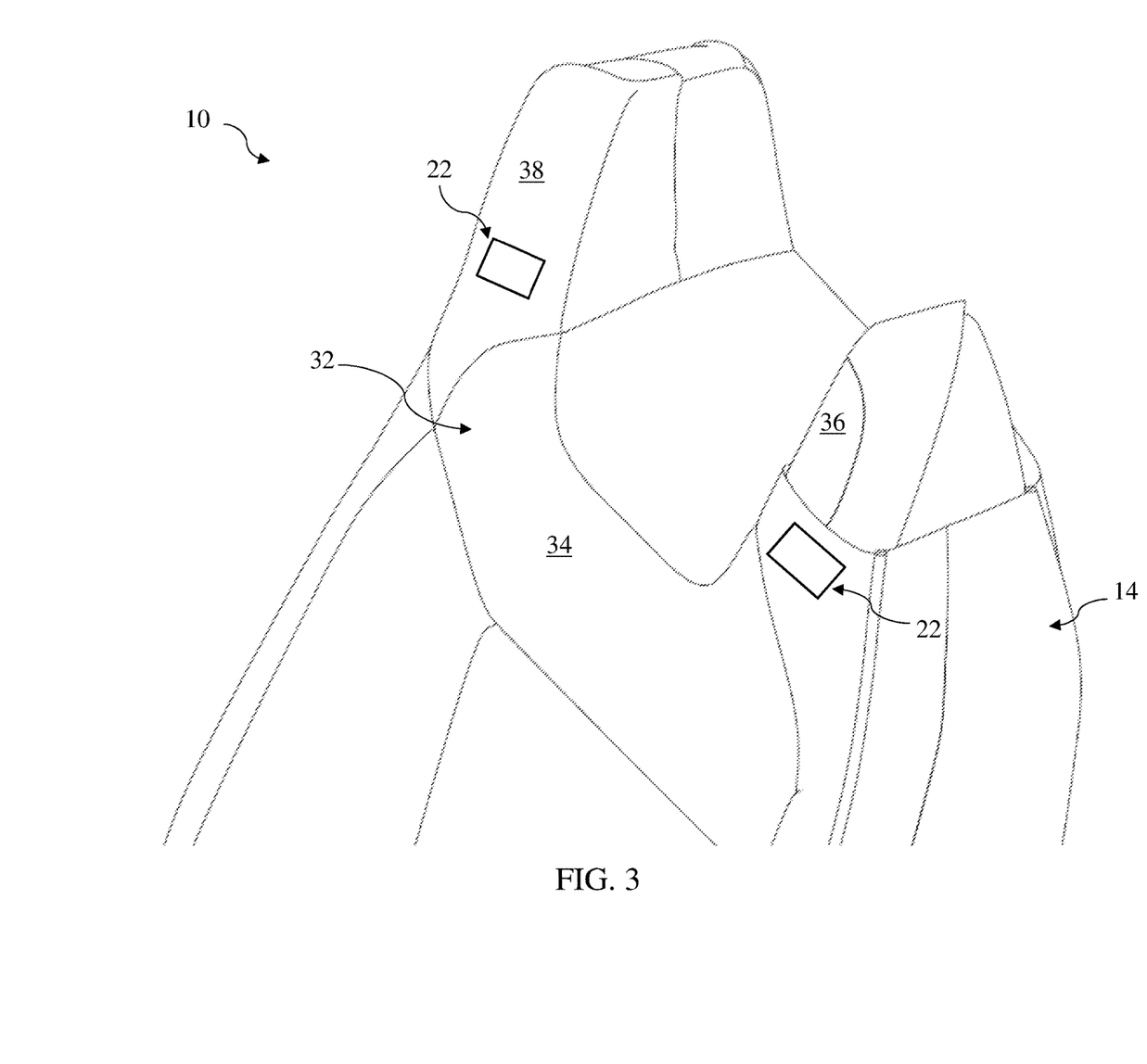
FIG. 3 is a perspective view of another portion of a seat, according to various implementations.

FIG. 1 illustrates a side view of a seat 10 according to various implementations. FIG. 2 shows a perspective view of a portion of the seat 10 in FIG. 1. FIG. 3 shows a perspective cut-away view of a portion of the seat 10 in FIGS. 1 and 2. FIGS. 1-3 are referred to concurrently.

As noted herein, the seat 10 can be: a vehicle driver seat, a vehicle passenger seat, an entertainment venue seat, a gaming seat, and/or a home entertainment seat. In certain cases, seat 10 can serve multiple purposes, e.g., as a gaming seat and a home entertainment seat (e.g., in a home theater). In additional cases, the seat 10 can be one of a plurality of seats in a vehicle, which may include similar components and/or capabilities. Various seating configurations can benefit from aspects of the seat(s) illustrated according to various implementations, including among others: stadium seating in entertainment venues, multi-passenger vehicle seating configurations (e.g., where seat(s) 10 are used for the driver and/or passengers), home entertainment configurations (e.g., where a row or plurality of seat(s) 10 are arranged), and others. In some examples, the seat 10 is a seat in a ride sharing vehicle, a limousine, a bus, or a public transit vehicle. In particular examples, the seat 10 is one of a plurality of vehicle passenger seats, one or more of which includes the loudspeaker assembly. In some aspects, two or more of the seats 10 are arranged facing one another, e.g., in an across-the-aisle type configuration or in a huddle-around configuration. In certain cases, the seat(s) 10 disclosed herein can benefit from being located in a cabin or other closed space such as in a vehicle cabin (or, cab). Certain acoustic benefits can be realized in such cabin configurations. However, many of the benefits of the seat(s) 10 disclosed herein can be realized in other seating configurations and other environments.

In various implementations, the seat 10 includes a base 12, a seat backrest portion 14 coupled with the base 12 (e.g., at a hinge point 16), and a seat headrest portion 18 coupled with the seat backrest portion 14. In certain implementations, the seat headrest portion 18 is adjustable relative to the seat backrest portion 14. In other cases, the seat headrest portion 18 is fixed relative to the seat backrest portion 14. The seat 10 further includes a loudspeaker assembly 20 with an acoustic exit 22 fixed in the seat backrest portion 14. The loudspeaker assembly 20 also includes an acoustic driver (e.g., electroacoustic transducer) 24 for generating an acoustic output. In the example illustrated in FIG. 1, the driver 24 is located proximate (e.g., next to, or adjacent to) the acoustic exit 22. However, this proximity is not required. That is, in various additional implementations, the driver 24 can be physically separated from the acoustic exit 22, e.g., by several centimeters (cm) or more. In certain cases, the driver 24 is separated from the acoustic exit 22 by 20 mm, 30 mm, 40 mm, 50 mm or more. In particular cases, an acoustic channel or a waveguide (not shown) connects the driver 24 and the exit 22, such that the driver 24 is located closer to the base 12 of the seat 10 than the exit 22, or the driver 24 is internally mounted in the seat backrest portion 14, e.g., near the mid-point between the base 12 and the headrest portion 18. In certain cases, the acoustic exit 22 is covered by a grill and/or by an acoustically transparent covering of the backrest.

In various implementations, the loudspeaker assembly 20 may include an enclosure 21 mounted in the backrest portion 14, or a mounting plate or other suitable mechanical arrangement. In some examples, a void in the backrest portion 14 (e.g., a space within and/or between cushioning and/or structural elements of the backrest portion 14) may serve as an acoustic volume that affects a tuning of the driver 24.

The acoustic channel may have an increasing cross-section, e.g., getting larger as it gets further from the driver 24, as is generally illustrated in FIG. 1. In other examples, an acoustic channel may have varying shapes and may have decreasing or substantially constant cross-section.

In various examples, an acoustic channel, enclosure, and/or void in the backrest portion 14 may impact the directivity of the driver 24. Such arrangements may be deemed an acoustic assembly in general, and references to directivity herein may refer to the directivity of such an acoustic assembly when installed, unless the context clearly indicates otherwise. In some examples, such as when an acoustic channel does not occlude the driver 24 (e.g., does not get in the way of a direct line from the driver 34 to the ear), the directivity of the acoustic assembly may be substantially the same as the directivity of the driver 24, especially at mid-range to higher frequencies where the acoustic output becomes more directional. In various disclosed examples, therefore, the directivity of the acoustic assembly may be substantially aligned with the axis of the driver 24.

In any case, the acoustic exit 22 of the loudspeaker assembly 20 is fixed in the seat backrest portion 14, and in particular cases, is fixed relative to the seat backrest portion 14. That is, as the seat backrest portion 14 is moved (e.g., reclined or inclined, raised or lowered), the acoustic exit 22 remains fixed relative to the seat backrest portion 14. It is understood, however, that the firing angle of the driver 24 (and consequently, the acoustic exit 22) can change relative to the nominal ear position as the seat backrest portion 14 is inclined (e.g., moved vertically farther from the seat hip point (HP)) and reclined (e.g., moved vertically closer to the HP). In certain of these cases, as the backrest portion 14 is inclined from the 21 degree reference position in FIG. 1, the firing angle becomes more downward, while as the backrest portion 14 is reclined from the 21 degree reference position, the firing angle becomes more upward. This is due in part to how the occupant tends to slide, or slouch in the seat while reclining, and tends to sit upright as the seat is brought upright.

In certain other implementations, the firing angle of the driver 24 and/or the angle of the acoustic exit 22 can be adjustable within a relatively narrow range, e.g., via movement of the driver 24 and/or adjustment of the acoustic enclosure and/or walls defining the exit 22. This small adjustment can be beneficial in compensating for sliding or slouching by the occupant when the seat reclines beyond a particular angle, e.g., at or beyond a 30 degree recline, 40 degree recline, or 45 degree recline. In particular examples, the firing angle of the driver 24 and/or the angle of the acoustic exit 22 is configured to adjust, e.g., by several degrees, in response to the recline angle of the seat reaching a threshold. Firing angle adjustment can be automated, e.g., via control system command and/or via a weighted adjustment mechanism.

In certain implementations, the acoustic exit 22 is angled to provide the acoustic output (from driver 24, along axis (a)) to a location 26 below the nominal ear position 28 of an occupant 30 (illustrative nominal occupant, AM50, shown) of the seat 10. In some implementations, the location 26 is approximately 60 millimeters below the nominal ear position 28, plus or minus approximately 50 millimeters.

In particular cases, the firing angle ($\alpha$) of the driver 24 (as measured from acoustic exit 22) provides the acoustic output to achieve a consistent frequency response across a range of positions that deviate from the nominal ear position 28. In certain cases, the range of positions deviating from the nominal ear position include lower positions associated with occupants sitting lower in the seat, or higher positions associated with occupants sitting higher in the seat. The range (Range) of positions is illustrated in a non-limiting example in FIG. 1, and in some cases, spans from the an expected ear position of a 95th percentile adult male (annotated AM95) to a 5th percentile adult female (annotated AF05). AM95 indicates a location that is about 60 millimeters (mm) higher than AM50, while AF05 indicates a location that is about 116 mm lower than AM50.

In various implementations the firing angle ($\alpha$) of the driver 24 can be measured relative to a horizontal plane intersecting the seat backrest portion 14 while in the reference recline angle of 21 degrees, as shown in FIG. 1. The firing angle ($\alpha$) of the driver 24 (as output via acoustic exit 22) can be equal to approximately 5 degrees to approximately 15 degrees in some cases, approximately 7 degrees to approximately 13 degrees in additional cases, approximately 8 degrees to approximately 12 degrees in additional cases, and approximately 10 degrees to 11 degrees in additional cases. In a specific example, the firing angle ($\alpha$) of the driver 24 is equal to approximately 10.8 degrees. It is understood that this firing angle ($\alpha$) of the driver 24 can vary with seatback angle variation, which can range from several degrees up to approximately +/−10 degrees. In any case, the firing angle ($\alpha$) of the driver 24 (and corresponding acoustic exit 22) directs the acoustic output to the location 26 below the ear of the occupant 30. It is understood that the acoustic channel around the driver 24 can be flared in various implementations, e.g., with a tolerance of approximately +/−15 degrees.

In certain of these cases, as illustrated in the example in FIG. 1, the acoustic exit 22 is located below the nominal ear position 28 of the occupant 30 relative to the hip point (HP) of the seat 10. In particular examples (at 21 degree recline angle), as indicated by distance (h) in FIG. 1, a center of the acoustic exit 22 is approximately 562 mm to approximately 650 mm vertically higher than the HP of seat 10. In more particular examples, the center of the acoustic exit 22 is approximately 562 mm to approximately 577 mm vertically higher than the HP of seat 10. In further particular examples, the center of the acoustic exit 22 is approximately 567 mm to approximately 572 mm vertically higher than the HP of seat 10. In a particular example such as shown in FIG. 1, where the firing angle ($\alpha$) of the driver 24 is approximately 10 degrees to approximately 11 degrees, the center of the acoustic exit 22 is approximately 567 mm vertically higher than the HP of seat 10.

In some cases, the consistent frequency response of the acoustic output is a function of both the firing angle ($\alpha$) of the driver 24 and the location of the exit 22, e.g., relative to the nominal ear position 28 of the occupant 30. For example, the consistent frequency response can be characterized by a high frequency (HF) consistency greater than an HF consistency for an acoustic output provided to the nominal ear position 28. In particular examples, the acoustic output from the seat 10 has a HF frequency response variation equal to or less than approximately one-half a HF frequency response variation for the acoustic output provided to the nominal ear position 28. In further particular cases, the HF frequency response variation of the acoustic output from the seat 10 is approximately one-third to approximately one-half the HF frequency response variation for the acoustic output provided to the nominal ear position 28. In illustrative examples, the HF frequency response variation of the acoustic output from seat 10 was found to be around 12 dBSPL/V or less in some cases, around 10 dBSPL/V or less in further cases, and around 5 dBSPL/V or less in still further cases. These HF frequency response variations were compared with the following HF frequency response variations for the acoustic output provided to the nominal ear position: 15 dBSPL/V, 15 dBSPL/V, and 10 dBSPL/V, respectively.

In certain implementations, the acoustic output from the seat 10 has a mid-range frequency (MF) frequency response variation that is less than a MF frequency response variation for the acoustic output provided to the nominal ear position 28. In particular examples, this MF frequency response variation from the seat 10 is about 10-20 percent less than the MF frequency response variation for the acoustic output provided to the nominal ear position 28. In still further implementations, the consistent frequency response of the acoustic output from seat 10 is further characterized by a LF consistency equal to or greater than a LF consistency for an acoustic output provided to the nominal ear position 28.

In some implementations, HF is equal to or greater than approximately 4 kilo-Hertz (kHz), and may span up to approximately 20 kHz or more, and LF is equal to approximately 1 kHz or less. Mid-range frequencies can be equal to approximately 1 kHz to approximately 4 kHz.

In certain example implementations, the "consistent frequency response" includes a frequency response of the loudspeaker assembly 20, and is characterized by at least one of: inter-aural isolation for the occupant 30, or seat-to-seat isolation between multiple occupants of a space including the seat 10 (e.g., multiple occupants in a vehicle, or multiple occupants in a home theater or entertainment venue). In seats having two loudspeaker assemblies (e.g., left and right loudspeaker assemblies 20), seat-to-seat isolation is maintained by both loudspeaker assemblies 20 in the seat 10.

In some cases (e.g., as visible in FIGS. 2, 3 and 5) the seat 10 includes at least two loudspeaker assemblies 20 such as left and right loudspeaker assemblies. In certain of these cases, the seat 10 is a vehicle seat, with an inboard loudspeaker assembly (closer to the center of the vehicle cabin) and an outboard loudspeaker assembly (closer to the vehicle's external wall or door). According to various implementations, for the loudspeaker assembly 20 positioned in the outboard location, the LF consistency of the acoustic output from the seat 10 is greater than the LF consistency for the acoustic output provided to the nominal ear position 28.

In certain examples, such as illustrated in FIGS. 2 and 3, the seat backrest portion 14 has a middle portion 34 and two flanks 36, 38 extending from opposite sides 40, 42 of the middle portion 36. In certain cases, without the occupant 30 in the seat 10, the front surface 32 of the backrest portion 14 at each flank 36, 38 is angled relative to the front surface 32 of the middle portion 36. In these cases, the acoustic exit(s) 22 of each loudspeaker assembly 20 are located in one of the flanks 36, 38.

In particular examples, as shown in FIG. 2, the acoustic exits 22 have an inward firing angle relative to the front surface 32 of the middle portion 36. In further examples, as shown in the top cross-sectional view of seat 10 in FIG. 5, the drivers 24 in a two-driver configuration can have an inward (lateral) firing angle (β) of approximately 5 degrees to approximately 15 degrees when measured from a centerline that bisects the backrest portion 14. In particular cases, the lateral firing angle (β) is equal to approximately 8 degrees to approximately 12 degrees, and in more particular cases, is equal to approximately 10 degrees. As described further herein with respect to FIG. 8, inward firing angles can vary based on vertical positioning of drivers 24, e.g., larger (h) values are associated with lower inward firing angles.

As noted herein, according to various implementations, the seat headrest portion 18 is adjustable relative to the seat backrest portion 14. For example, FIG. 1, FIG. 2, and FIG. 5 each illustrate configurations of a seat headrest portion 18 that is adjustable relative to the seat backrest portion 14. For example, the seat headrest portion(s) 18 can be moved vertically relative to the seat backrest portion 14, and in particular cases, can be configured to slide in a direction that is not strictly vertical. In particular cases, such as the configuration illustrated in FIG. 2, the seat headrest portion 18 has at least a section 44 that is vertically aligned with a section 46 of the seat backrest portion 14 relative to the hip point (HP) of the seat 10. In certain cases, the section 46 of the seat backrest 14 vertically overlaps the section 44 of the seat headrest portion 18. In additional implementations, such as the configurations illustrated in FIGS. 1-3 (as well as FIGS. 7 and 8), the seat backrest 14 (e.g., section 46) extends above a nominal shoulder 48 of the occupant 30 (FIG. 1).

Figure 4:
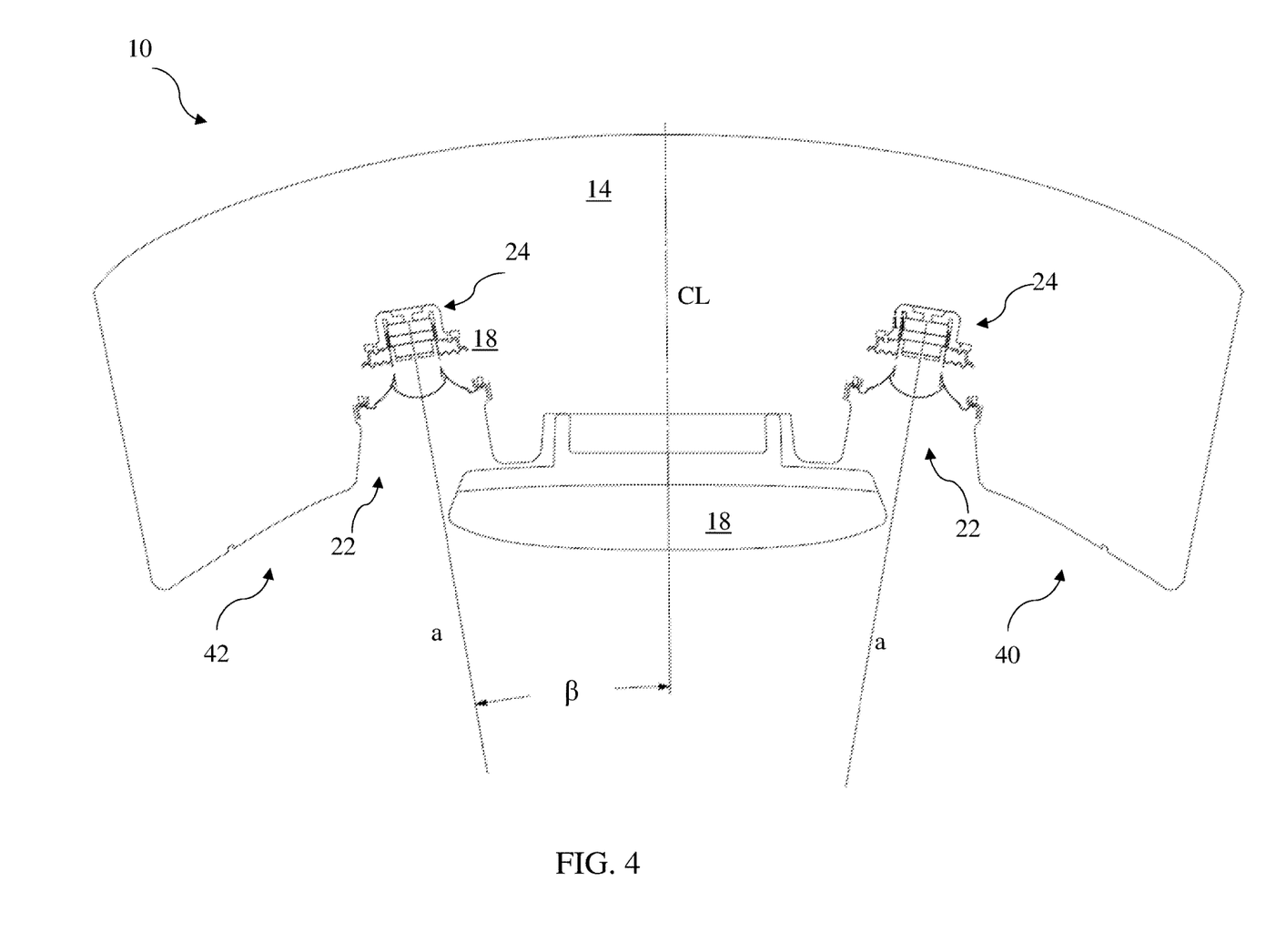
FIG. 4 is a top cross-sectional view of a seat, according to various implementations.
Figure 5:
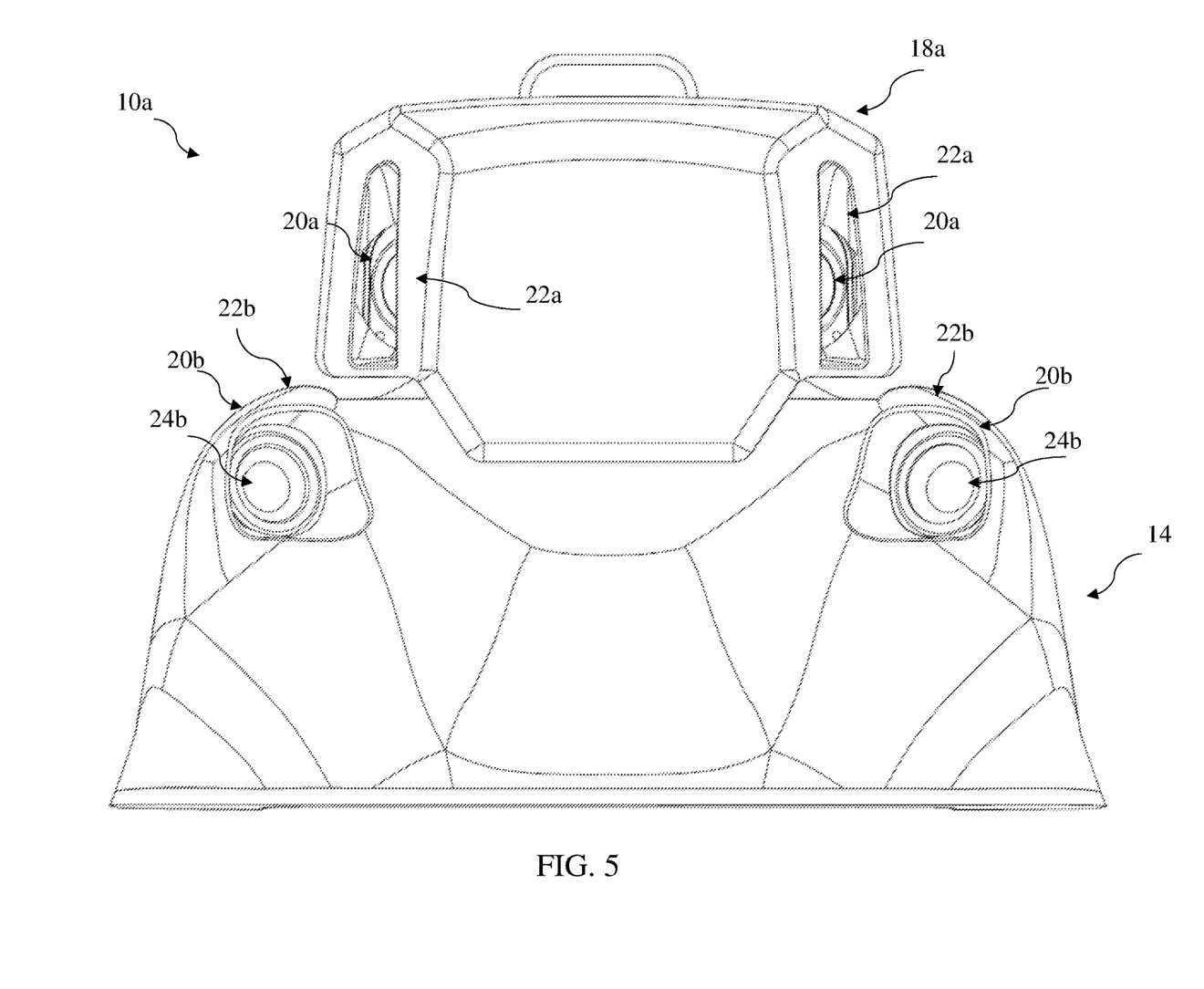
FIG. 5 is a front view of a portion of a seat according to various additional implementations.

FIG. 5 illustrates a variation on the seat(s) illustrated in FIGS. 1-4. In particular, the seat 10a in FIG. 5 is shown including loudspeaker assemblies 20a mounted in the headrest portion 18a of the seat 10a. In these cases, the loudspeaker assemblies 20a in the headrest portion 18a are positioned with exits 22a that have outward firing angles, while loudspeaker assemblies 20b in the backrest portion 14 are positioned with exits 22b that have inward firing angles. In certain of these cases, the loudspeaker assemblies 20b in the backrest portion 14 have an upward firing angle and are located vertically below the nominal ear position as described with reference to any of FIGS. 1-4. In some examples, additional features of a headrest portion similar to the headrest portion 18a can be found in U.S. Pat. No. 10,730,423, which is incorporated herein by reference in its entirety. Further description of seating positions and acoustic parameters of occupants in seats can be found in U.S. Pat. No. 10,455,327 ("Binaural Measurement System"), which is incorporated herein by reference in its entirety.

Figure 6:
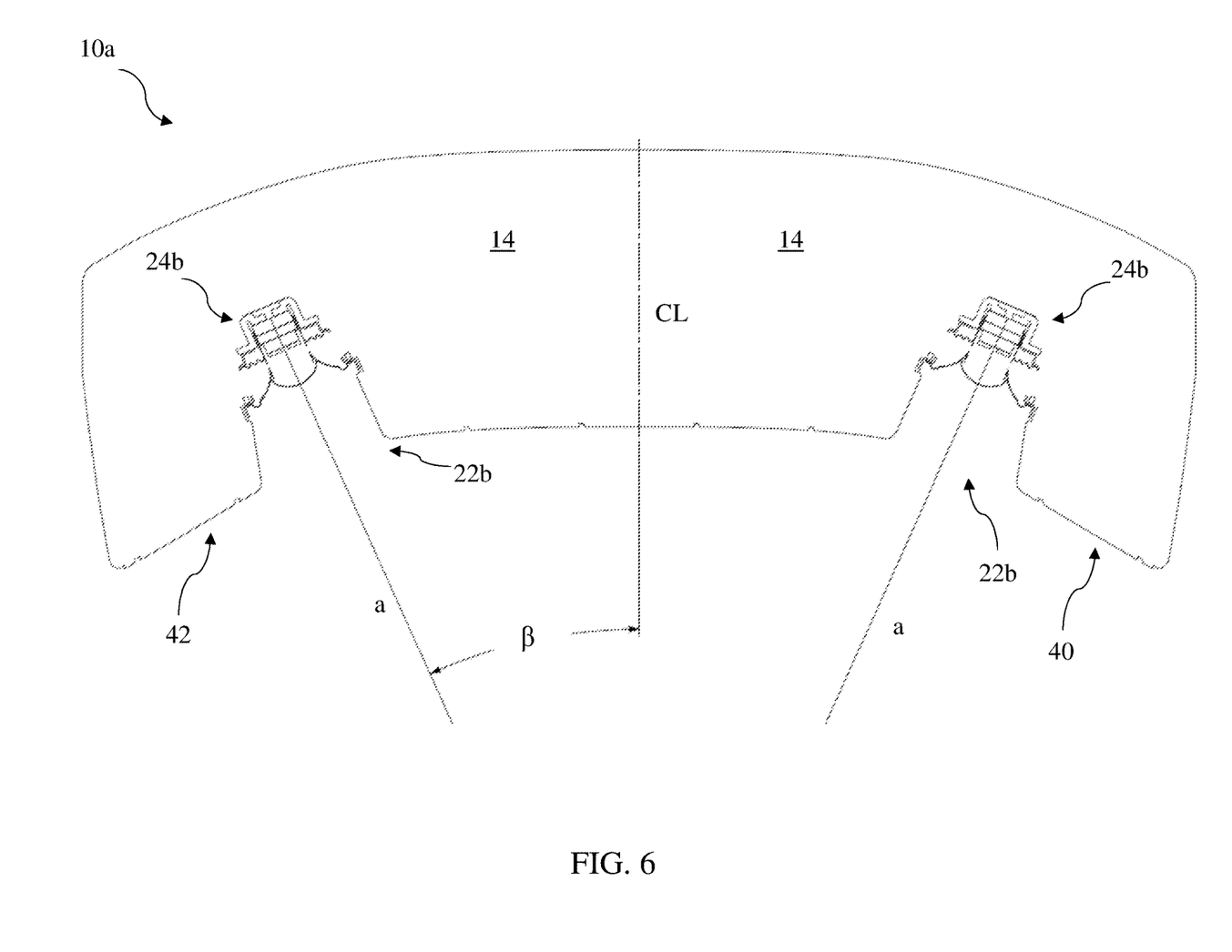
FIG. 6 is a top cross-sectional view of a seat according to various additional implementations.

FIG. 6 is a top cross-sectional view of a portion of seat 10a in FIG. 5. As illustrated in this example, the loudspeaker assemblies 20b in the backrest portion 14 have an inward (lateral) firing angle (β) of approximately 5 degrees to approximately 15 degrees when measured from a centerline (CL) that bisects the backrest portion 14. In particular cases, the lateral firing angle (β) is equal to approximately 14 degrees to approximately 34 degrees, and in more particular cases, is equal to approximately 20 degrees to approximately 28 degrees, and in further particular cases is equal to approximately 24 degrees. As described further herein with respect to FIG. 8, inward firing angles can vary based on vertical positioning of drivers 24, e.g., larger (h) values are associated with lower inward firing angles.

Figure 7:
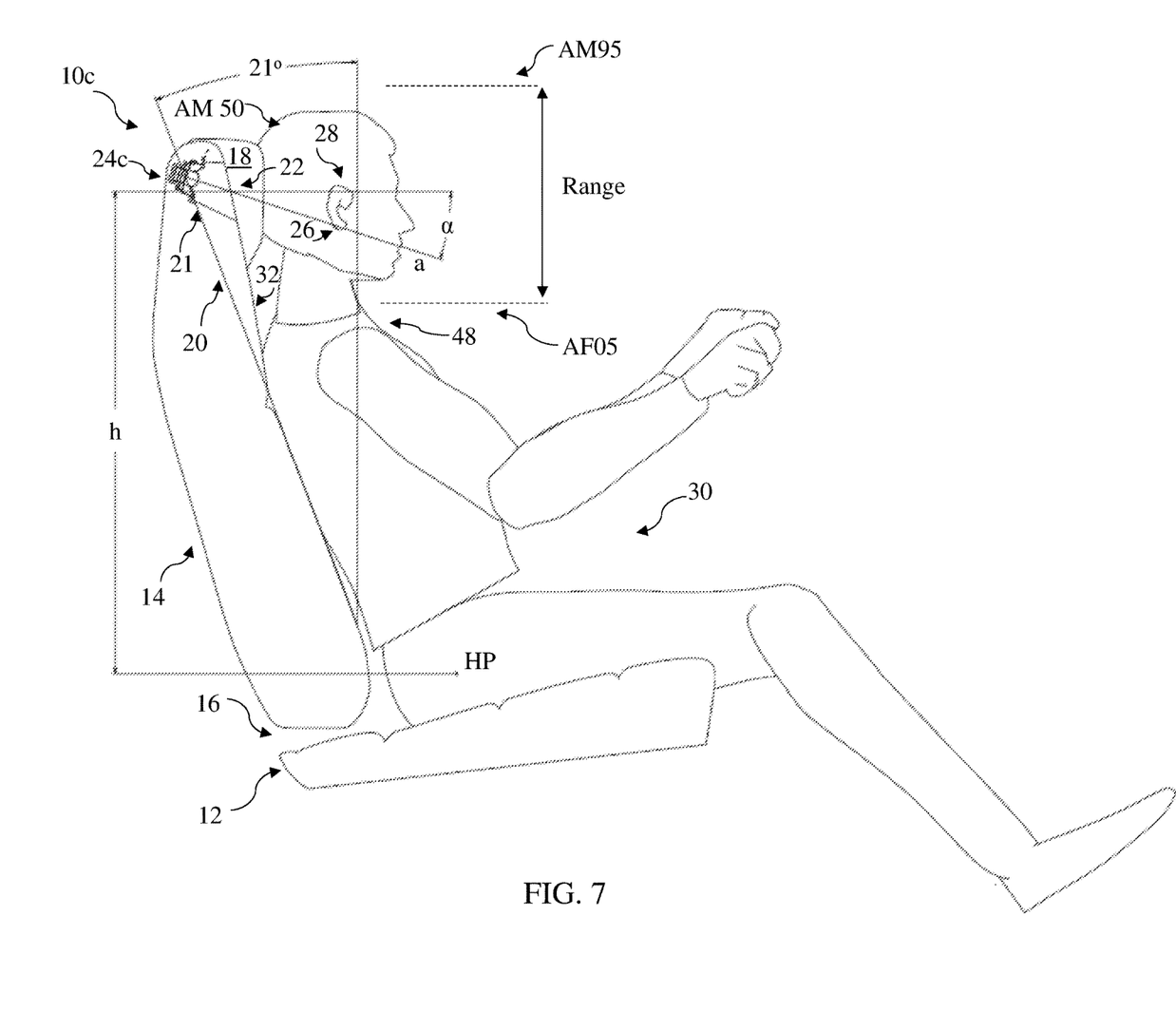
FIG. 7 is a schematic side view of an example seat according to various further implementations.

FIG. 7 illustrates a variation on a seat 10c according to various implementations. In this configuration, seat 10c includes at least one driver 24c (e.g., two drivers, one on each side of seat 10c) that is mounted in the seat 24c at a location above the shoulder 48 of the nominal occupant 30. In this case, the driver 24c has a downward firing angle (α) relative to horizontal in order to direct the acoustic output to the location 26 below the ear of the nominal occupant 30. In these cases, the backrest 14 can extend above the shoulder 48 of the nominal occupant 30, and at least a portion of the headrest 18 is interposed between sections of the backrest 14. In certain of these cases, the headrest 18 is adjustable (e.g., in height or angle), while in others, the headrest 18 is fixed (e.g., in a "mummy" style seat). In any case, the downward firing angle (α) is configured to deliver the acoustic output to the location 26 below the ear of the nominal occupant 30, and provide a consistent frequency response across the range (Range) of positions in the seat 10c. In certain cases, the firing angle (α) is equal to approximately 13 to approximately 23 degrees (or, relative to horizontal, approximately −13 degrees to approximately −23 degrees). In more particular cases, the firing angle (α) is equal to approximately −15 degrees to approximately −21 degrees. In further particular cases, the firing angle (α) is equal to approximately −18 degrees. According to certain implementations, the height (h) of the exit 22 is greater than in the upward firing configurations described herein, e.g., as compared with seat 10 in FIG. 1. That is, in various implementations having a downward (or negative) firing angle (α) such as seat 10c, the height (h) of the exit 22 is equal to approximately 642 mm to approximately 652 mm. In more particular cases, the height (h) of the exit is less than approximately 650 mm, and in particular cases, is equal to approximately 647 mm.

Figure 8:
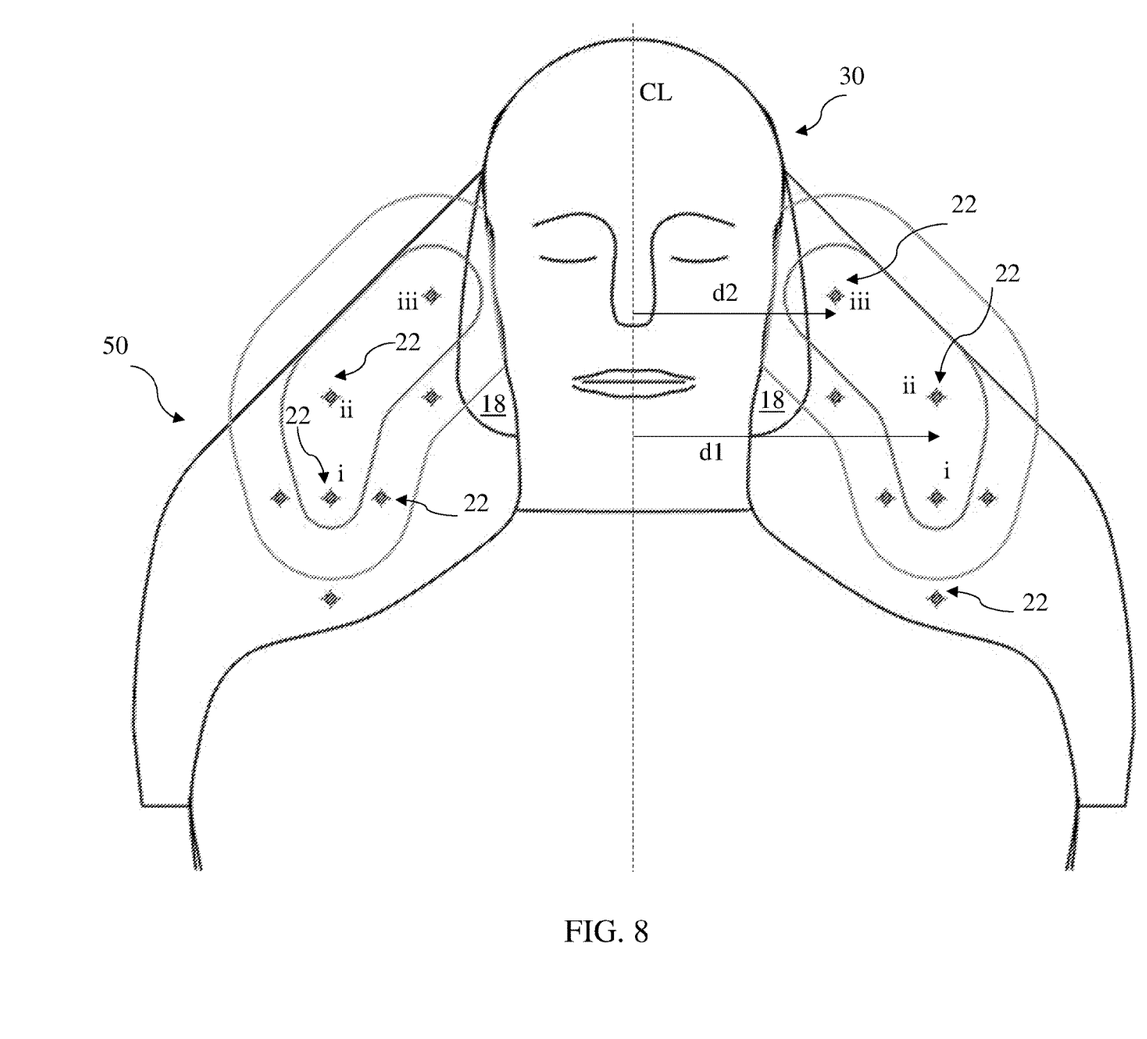
FIG. 8 illustrates acoustic exit locations in seats according to various implementations.

FIG. 8 is a schematic depiction of a portion of a seat 50 with an occupant 30 according to various implementations. In this depiction, three variations on the position of exits from loudspeaker assemblies 20 in the backrest portion 14 are illustrated. For example, a first position (i) illustrates an exit 22 having a transducer (not shown) with a first upward firing angle (e.g., as shown in FIGS. 1, 2, 3 and 6), a second position (ii) illustrates an exit 22 having a transducer with a second upward firing angle, and a third position (iii) illustrates an exit 22 having a transducer with either a downward firing angle or an approximately normal firing direction (e.g., as shown in FIGS. 4 and 7). While the acoustic exit 22 is described in various implementations as having an upward firing angle relative to the front surface 32 of the seat backrest portion 14 adjacent to the exit 22 (e.g., in positions (i) and/or (ii)), in certain additional implementations, the acoustic exit 22 has a downward firing angle relative to the front surface 32 of the seat backrest portion 14 adjacent to the exit 22 (e.g., in position (iii)). In these cases, position (iii) can be located at approximately the same height as the nominal ear position 28, or slightly above the nominal ear position 28 (as shown in FIG. 7). Additional exit 22 positions are illustrated by stars in seat 50, merely as examples. In certain non-limiting examples, in position (i) and/or position (ii), a centerline (CL) to exit 22 spacing (d1) is equal to approximately 270 mm to approximately 330 mm, and in some particular examples, approximately 300 mm. In additional non-limiting examples, in position (iii), a centerline (CL) to exit 22 spacing (d2) is equal to approximately 180 mm to approximately 220 mm, and in particular examples, approximately 200 mm.

The loudspeaker position and orientation combinations illustrated in FIGS. 1-8 may provide a better acoustic performance across a range of individuals than conventional seatback speakers. The loudspeaker may be closer to an ear position of shorter individuals but the orientation of the loudspeaker means that an ear position of taller individuals is more in line with the directivity of the loudspeaker (or the acoustic assembly).

Accordingly, as an occupant's height and ear position varies, a trade-off occurs between distance from the loudspeaker and alignment with the directivity of the loudspeaker(s) and/or acoustic assembly. This provides a benefit because the designer of the vehicle seat does not know the position of the occupant's ear because many different occupants may use the vehicle seat at different times. Accordingly, the seatback speakers in accord with the examples described herein are beneficial for not knowing where the occupant's ear is located and may provide substantially equal acoustic performance regardless of the occupant's ear position, e.g., regardless of who uses the seat.

Further, while an ear position of a taller individual is further from the loudspeaker, it may also be closer to a roof or headliner of a vehicle, and may benefit from acoustic reinforcement from the headliner (and/or roof). Additionally, the taller individual's shoulders may be positioned nearer to being in front of the loudspeaker and may also provide acoustic reinforcement. For completeness, relatively shorter individuals may have an ear position closer to the loudspeaker and thus not require acoustic reinforcement. Accordingly, the loudspeaker may be suitably positioned lower in the backrest, in accord with some of the examples described herein.

Certain components in the disclosed systems may not be depicted, but are understood to enable various additional functions. For example, systems can include additional electronics including but not limited to power source(s), processors, memory, communications components such as transmitters/receivers, network connection equipment (including but not limited to: Wi-Fi, Bluetooth, cellular or near field communications (NFC) equipment) and location-identification components (e.g., GPS systems). Additionally, systems disclosed herein can include one or more interfaces allowing user interaction that includes one or more conventional inputs, such as haptic inputs including a dial, button, touch screen, etc. Additional interfaces can include a fabric with integrated sensing/interface components, which can be referred to as a "smart" fabric. The interface can also include a voice command interface, such that the user can make adjustments using voice commands. The interface can also include a gesture-based interface, such that the user can make adjustments with gestures (e.g., hand wave, nodding, etc.).

Commonly labeled components in the FIGURES are considered to be substantially equivalent components for the purposes of illustration, and redundant discussion of those components is omitted for clarity. Numerical ranges and values described according to various implementations are merely examples of such ranges and values, and are not intended to be limiting of those implementations. In some cases, the term "approximately" is used to modify values, and in these cases, can refer to that value +/− a margin of error, such as a measurement error, which may range from up to 1-3 percent.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A seat comprising:
a seat headrest portion;
a seat backrest portion; and
a loudspeaker assembly comprising:
at least one driver for generating an acoustic output; and
an acoustic exit fixed in the seat backrest portion and angled to provide the acoustic output to a location below a nominal ear position of an occupant of the seat, wherein an angle of the at least one driver provides the acoustic output to achieve a consistent frequency response across a range of positions deviating from the nominal ear position,
wherein the acoustic exit is located below the nominal ear position of the occupant relative to a hip point of the seat.

2. The seat of claim 1, wherein the location is approximately 60 millimeters below the nominal ear position, plus or minus approximately 50 millimeters, as measured from a hip point of the seat.

3. The seat of claim 1, wherein the seat is one of: a vehicle driver seat, a vehicle passenger seat, an entertainment venue seat, a gaming seat, or a home entertainment seat.

4. The seat of claim 1, wherein at a recline angle of approximately 21 degrees from vertical, a center of the acoustic exit is approximately 562 mm to approximately 650 mm vertically higher than a hip point of the seat.

5. The seat of claim 1, wherein the acoustic output from the seat has a high frequency (HF) response variation equal to or less than approximately one half a HF response variation for the acoustic output provided to the nominal ear position.

6. The seat of claim 1, wherein the consistent frequency response is characterized by a high frequency (HF) consistency greater than an HF consistency for an acoustic output provided to the nominal ear position.

7. The seat of claim 1, wherein the consistent frequency response is characterized by a low frequency (LF) consistency equal to or greater than a LF consistency for an acoustic output provided to the nominal ear position.

8. A vehicle comprising the seat of claim 1.

9. A seat comprising:
a seat headrest portion;
a seat backrest portion; and
a loudspeaker assembly comprising:
at least one driver for generating an acoustic output; and
an acoustic exit fixed in the seat backrest portion and angled to provide the acoustic output to a location below a nominal ear position of an occupant of the seat, wherein an angle of the at least one driver provides the acoustic output to achieve a consistent frequency response across a range of positions deviating from the nominal ear position,
wherein the acoustic exit is located below the nominal ear position of the occupant relative to a hip point of the seat,
wherein the seat is one of: a vehicle driver seat, a vehicle passenger seat, an entertainment venue seat, a gaming seat, or a home entertainment seat.

10. The seat of claim 9, wherein the acoustic output from the seat has a high frequency (HF) response variation equal to or less than approximately one half a HF response variation for the acoustic output provided to the nominal ear position.

11. The seat of claim 9, wherein the consistent frequency response is characterized by a high frequency (HF) consistency greater than an HF consistency for an acoustic output provided to the nominal ear position.

12. The seat of claim 11, wherein HF is at least approximately 4 kilo-Hertz (kHz) to approximately 12 kHz.

13. The seat of claim 9, wherein the consistent frequency response is characterized by a low frequency (LF) consistency equal to or greater than a LF consistency for an acoustic output provided to the nominal ear position.

14. The seat of claim 13, wherein LF is equal to approximately 1 kHz or less.

15. The seat of claim 13, wherein the seat comprises the vehicle seat and the loudspeaker assembly is positioned in an outboard location, and wherein the LF consistency of the acoustic output from the seat is greater than the LF consistency for the acoustic output provided to the nominal ear position.

16. A vehicle comprising the seat of claim 9, wherein the seat comprises the vehicle driver seat or the vehicle passenger seat.

* * * * *